US009874932B2

(12) United States Patent
Crisler et al.

(10) Patent No.: US 9,874,932 B2
(45) Date of Patent: Jan. 23, 2018

(54) AVOIDANCE OF COLOR BREAKUP IN LATE-STAGE RE-PROJECTION

(71) Applicant: Microsoft Technology Licensing, LLC, Redmond, WA (US)

(72) Inventors: Matthew Calbraith Crisler, Redmond, WA (US); Robert Thomas Held, Seattle, WA (US); Stephen Latta, Seattle, WA (US); Ashraf Ayman Michail, Kirkland, WA (US); Martin Shetter, Bellevue, WA (US); Arthur Tomlin, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 14/682,860

(22) Filed: Apr. 9, 2015

(65) Prior Publication Data

US 2016/0299567 A1 Oct. 13, 2016

(51) Int. Cl.
*G06F 3/01* (2006.01)
*G02B 27/01* (2006.01)
*H04N 13/04* (2006.01)

(52) U.S. Cl.
CPC ............ *G06F 3/013* (2013.01); *G02B 27/017* (2013.01); *H04N 13/044* (2013.01); *H04N 13/0422* (2013.01); *H04N 13/0459* (2013.01)

(58) Field of Classification Search
CPC .......... G06F 3/011; G06F 3/012; G06F 3/013; H04N 9/3111; G02B 2027/0116; G02B 2027/0187
See application file for complete search history.

(56) References Cited

U.S. PATENT DOCUMENTS 4,932,731 A 6/1990 Suzuki et al.
5,369,450 A 11/1994 Haseltine et al.
(Continued)

FOREIGN PATENT DOCUMENTS

DE 102012216581 A1 2/2014
WO 9720244 A1 6/1997
(Continued)

OTHER PUBLICATIONS

Beuret, et al., "Dynamic Aberration Correction for an Optical see-Through Head-Mounted Display", In Proceedings of Optical Systems Design, Dec. 18, 2012, 3 pages.
(Continued)

*Primary Examiner* — Sepehr Azari
(74) *Attorney, Agent, or Firm* — Alleman Hall Creasman & Tuttle LLP

(57) ABSTRACT

One embodiment provides a method to display video such as computer-rendered animation or other video. The method includes assembling a sequence of video frames featuring a moving object, each video frame including a plurality of subframes sequenced for display according to a schedule. The method also includes determining a vector-valued differential velocity of the moving object relative to a head of an observer of the video. At a time scheduled for display of a first subframe of a given frame, first-subframe image content transformed by a first transform is displayed. At a time scheduled for display of the second subframe of the given frame, second-subframe image content transformed by a second transform is displayed. The first and second transforms are computed based on the vector-valued differential velocity to mitigate artifacts.

20 Claims, 10 Drawing Sheets

(56) References Cited

U.S. PATENT DOCUMENTS

| | | | |
|---|---|---|---|
| 5,684,498 | A | 11/1997 | Welch et al. |
| 6,008,939 | A | 12/1999 | Hebert |
| 6,111,701 | A | 8/2000 | Brown |
| 7,148,860 | B2 | 12/2006 | Kooi et al. |
| 7,457,041 | B2 | 11/2008 | Tsan et al. |
| 8,482,859 | B2 | 7/2013 | Border et al. |
| 2009/0160957 | A1* | 6/2009 | Deng ............... G06T 7/238 348/208.99 |
| 2010/0073568 | A1* | 3/2010 | Van Ostrand ....... H04N 9/3111 348/578 |
| 2011/0255174 | A1 | 10/2011 | Bignolles |
| 2012/0105483 | A1* | 5/2012 | Fedorovskaya ...... G02B 27/017 345/660 |
| 2014/0064557 | A1* | 3/2014 | Hara ............... G06F 3/012 382/103 |
| 2014/0176591 | A1 | 6/2014 | Klein et al. |
| 2015/0205132 | A1* | 7/2015 | Osterhout ......... G02B 27/0172 345/633 |

FOREIGN PATENT DOCUMENTS

| | | |
|---|---|---|
| WO | 9920056 A1 | 4/1999 |
| WO | 2010009758 A1 | 1/2010 |
| WO | 2014105646 A1 | 7/2014 |

OTHER PUBLICATIONS

"Low-Latency Fusing of Color Image Data", U.S. Appl. No. 13/727,040, filed Dec. 26, 2012.

"Late Stage Reprojection", U.S. Appl. No. 13/951,351, filed Jul. 25, 2013.

Johnson, et al., "The visibility of color breakup and a means to reduce it" Journal of Vision (2014) 14(14):10, 1-13. Published Dec. 19, 2014. 13 pages. Available at: http://www.journalofvision.org/content/14/14/10.

Shimodaira, Y., "Invited Paper: Fundamental Phenomena Underlying Artifacts Induced by Image Motion and the Solutions for Decreasing the Artifacts on FPDs", In Proceedings of the Society for Information Display International Symposium Digest of Technical Papers, vol. 34, No. 1, May 20, 2003, 4 pages.

ISA European Patent Office, International Search Report and Written Opinion issued in PCT Application No. PCT/US2016/024714, Jun. 16, 2016, WIPO, 12 pages.

IPEA European Patent Office, Second Written Opinion Issued in PCT Application No. PCT/US2016/024714, Mar. 6, 2017, WIPO, 7 Pages.

IPEA European Patent Office, International Preliminary Report on Patentability Issued in PCT Application No. PCT/US2016/024714, dated Jun. 13, 2017, WIPO, 9 Pages.

\* cited by examiner

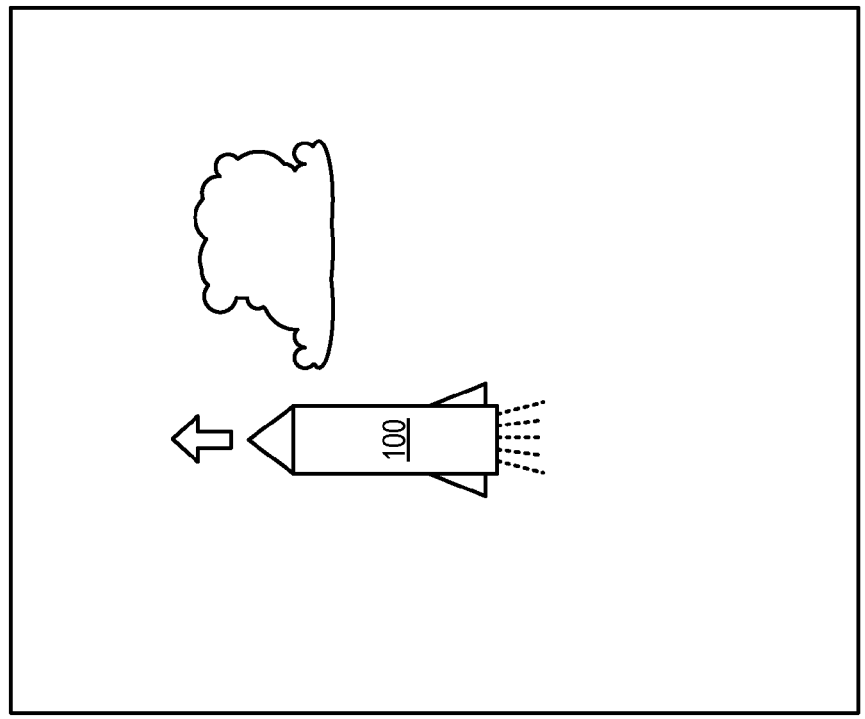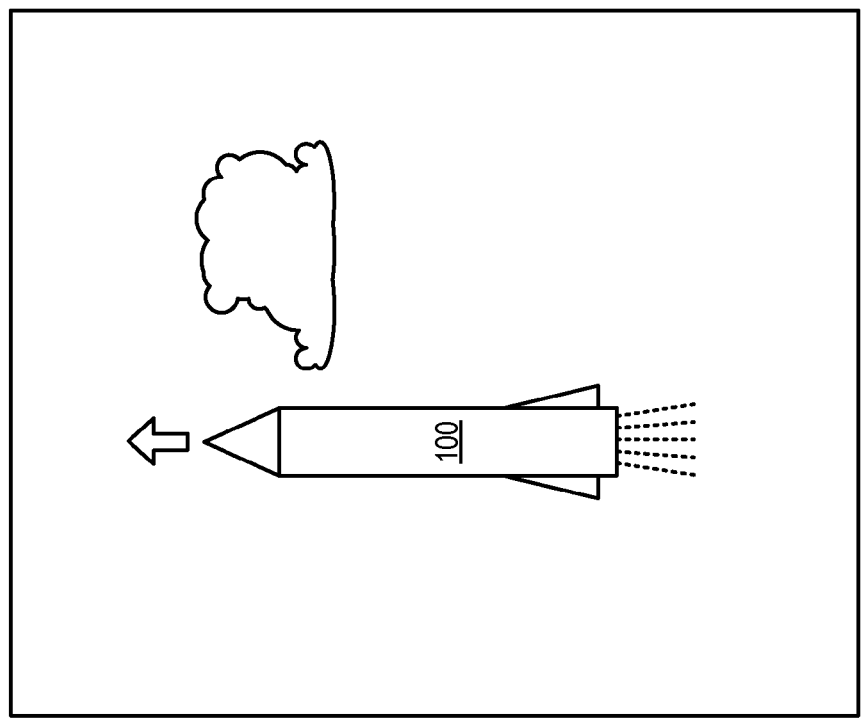
FIG. 9

AVOIDANCE OF COLOR BREAKUP IN LATE-STAGE RE-PROJECTION

BACKGROUND

A modern video-display system may be engineered to provide high resolution and color fidelity, together with low latency. Some video-display systems manage latency by updating each video frame portion-wise, instead of all at once. Examples of this strategy include field-sequential color display and rolling-shutter configurations.

SUMMARY

One embodiment provides a method to display video such as computer-rendered animation or other video. The method includes assembling a sequence of video frames featuring a moving object, each video frame including a plurality of subframes sequenced for display according to a schedule. The method also includes determining a vector-valued differential velocity of the moving object relative to a head of an observer of the video. At a time scheduled for display of a first subframe of a given frame, first-subframe image content transformed by a first transform is displayed. At a time scheduled for display of the second subframe of the given frame, second-subframe image content transformed by a second transform is displayed. The first and second transforms are computed based on the vector-valued differential velocity to mitigate artifacts.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Neither is the claimed subject matter limited to implementations that solve the prior disadvantages noted in this disclosure.

BRIEF DESCRIPTION OF THE DRAWINGS

FIG. 9 shows aspects of an example video frame including a moving object.

DETAILED DESCRIPTION

As mentioned above, some video-display systems manage latency by updating each video frame portion-wise, instead of all at once. Examples of this strategy include field-sequential color display and rolling-shutter configurations. However, portion-wise video updating may expose unwanted artifacts, such as color break-up and image distortion. As such, examples are disclosed herein that may help to reduce the occurrence and/or the severity of such artifacts.

Figure 1:
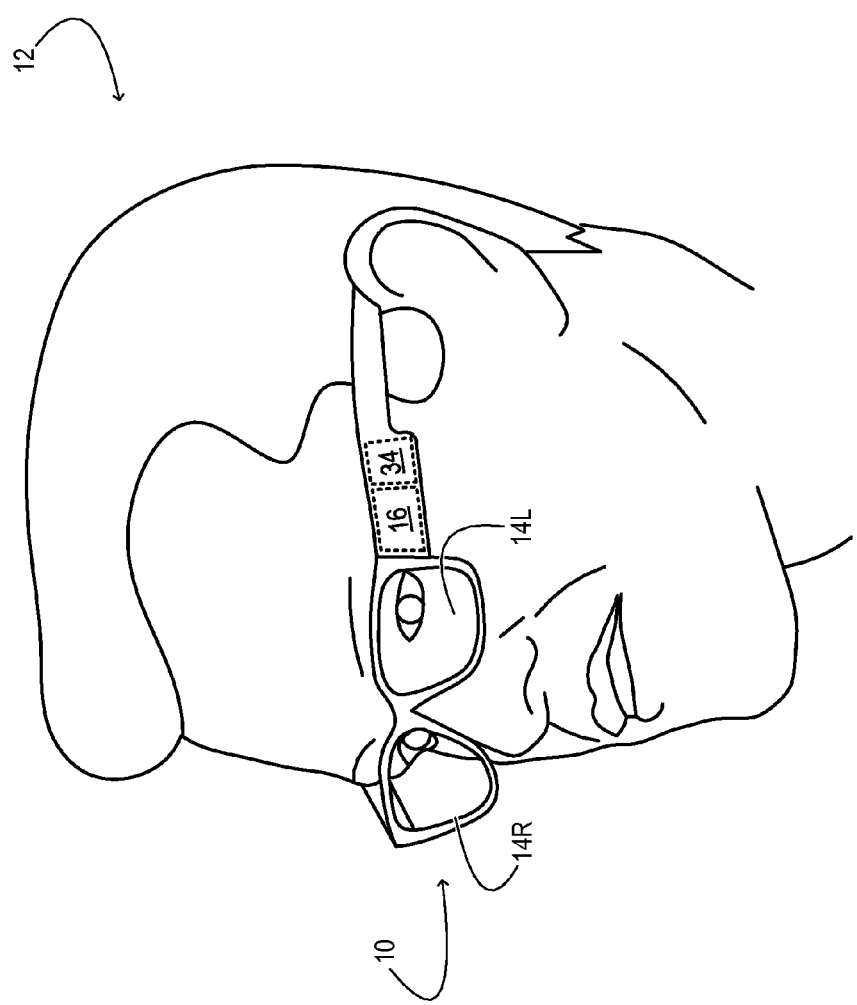
FIG. 1 shows aspects of an example wearable display device.

FIG. 1 shows aspects of an example electronic display system in the form of a wearable display device 10. The illustrated display device is intended to be worn on the head of observer 12, and includes active display optics 14—right display optic 14R and left display optic 14L. The active display optics in FIG. 1 are positioned in front of the observer's eyes. In display device 10, the active display optics are see-through—i.e., configured to transmit real, external imagery, which is presented to the observer in combination with virtual display content. By combining real and virtual imagery, the display device supports a so-called 'mixed reality' or 'augmented-reality' (AR) experience, in which the observer's perception of his or her environment is augmented by the virtual display content. Having independent right and left display optics, display device 10 may be configured to display stereoscopic image pairs in front of the observer's right and left eyes. Accordingly, the virtual display content may appear three-dimensional (3D) and may occupy any 3D position in the observer's field of view. Naturally, this approach can be used to provide a desirable AR gaming experience, though numerous applications outside the field of gaming are also supported.

Controller 16 of FIG. 1 supplies virtual display content to the active display optics 14. In some embodiments, the virtual display content is rendered locally by image-rendering componentry coupled within the display device (vide infra). In other embodiments, the virtual display content may be rendered on a remote determining system and transmitted to the controller via a wired or wireless communications link.

Figure 2:
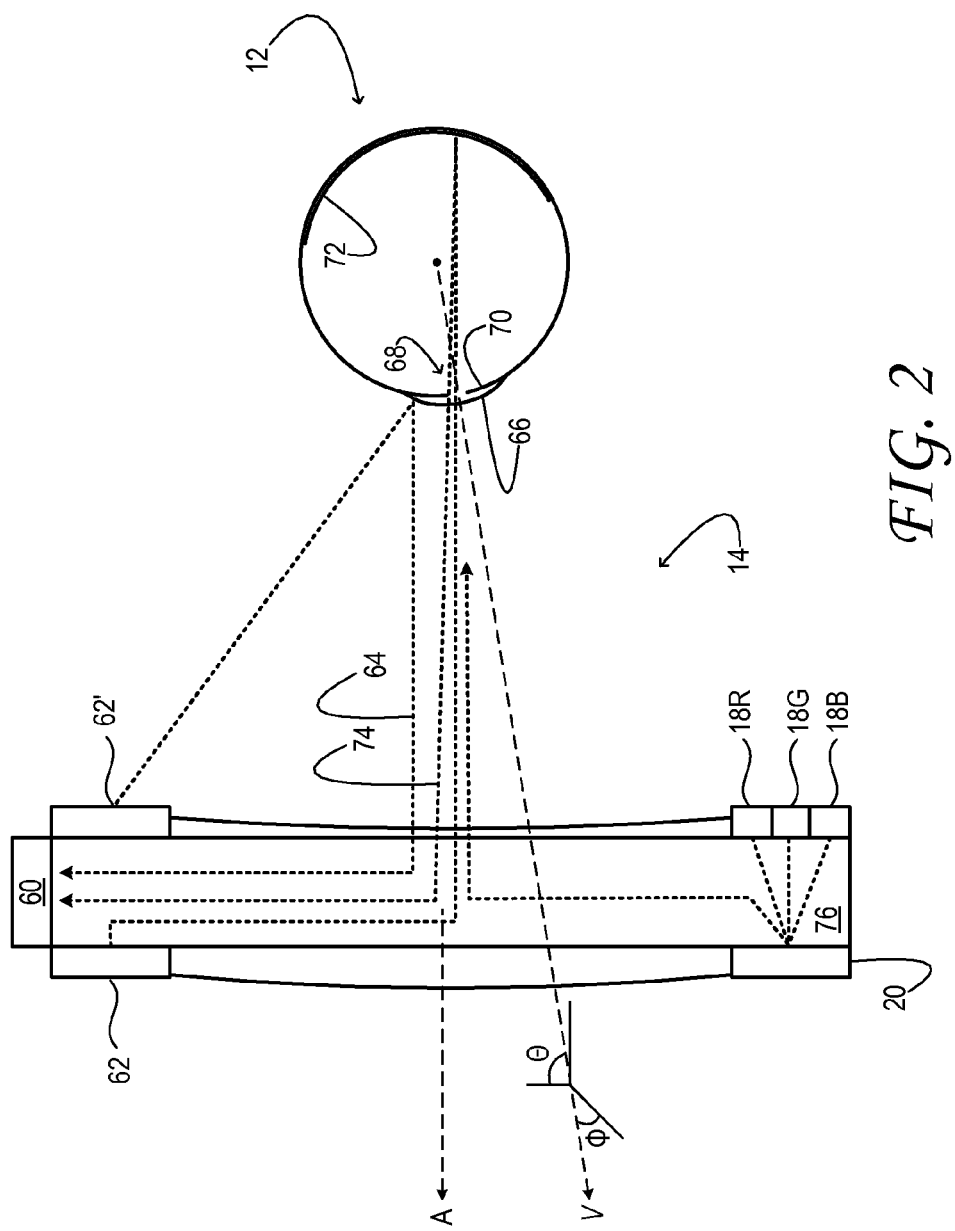
FIG. 2 shows aspects of an example active display optic of a wearable display device.

FIG. 2 shows aspects of an active display optic 14 in one, non-limiting implementation. The active display optic includes independently modulated red, green, and blue light emitting diodes (LEDs 18R, 18G, and 18B), and a reflective liquid-crystal display (LCD) matrix 20. The LEDs are configured to direct their emission onto the reflective LCD matrix, which forms a display image based on control signals from controller 16. In some embodiments, LEDs of each color may be triggered sequentially by the controller. In this approach, called 'field-sequential color display', three substantially monochromatic images of different colors are presented to the observer in rapid succession. Instead of registering each image separately, the observer's anatomical visual system mixes the color content from each image to form the intended color image.

Reflective LCD matrix 20 may include numerous, individually addressable pixel elements arranged on a rectangular grid or other geometry. In some embodiments, the reflective LCD matrix may be a reflective liquid-crystal-on-silicon (LCOS) matrix. In other embodiments, a digital micromirror array may be used in lieu of the reflective LCD matrix. In still other embodiments, active display optic 14 may include a transmissive LCD display with an LED backlight, a color-LED active matrix, or a holographic or scanned-beam system, to form right and left images. Although the drawings show separate right and left display optics, some display devices may include image-forming componentry extending over both eyes of the observer.

Figure 3:
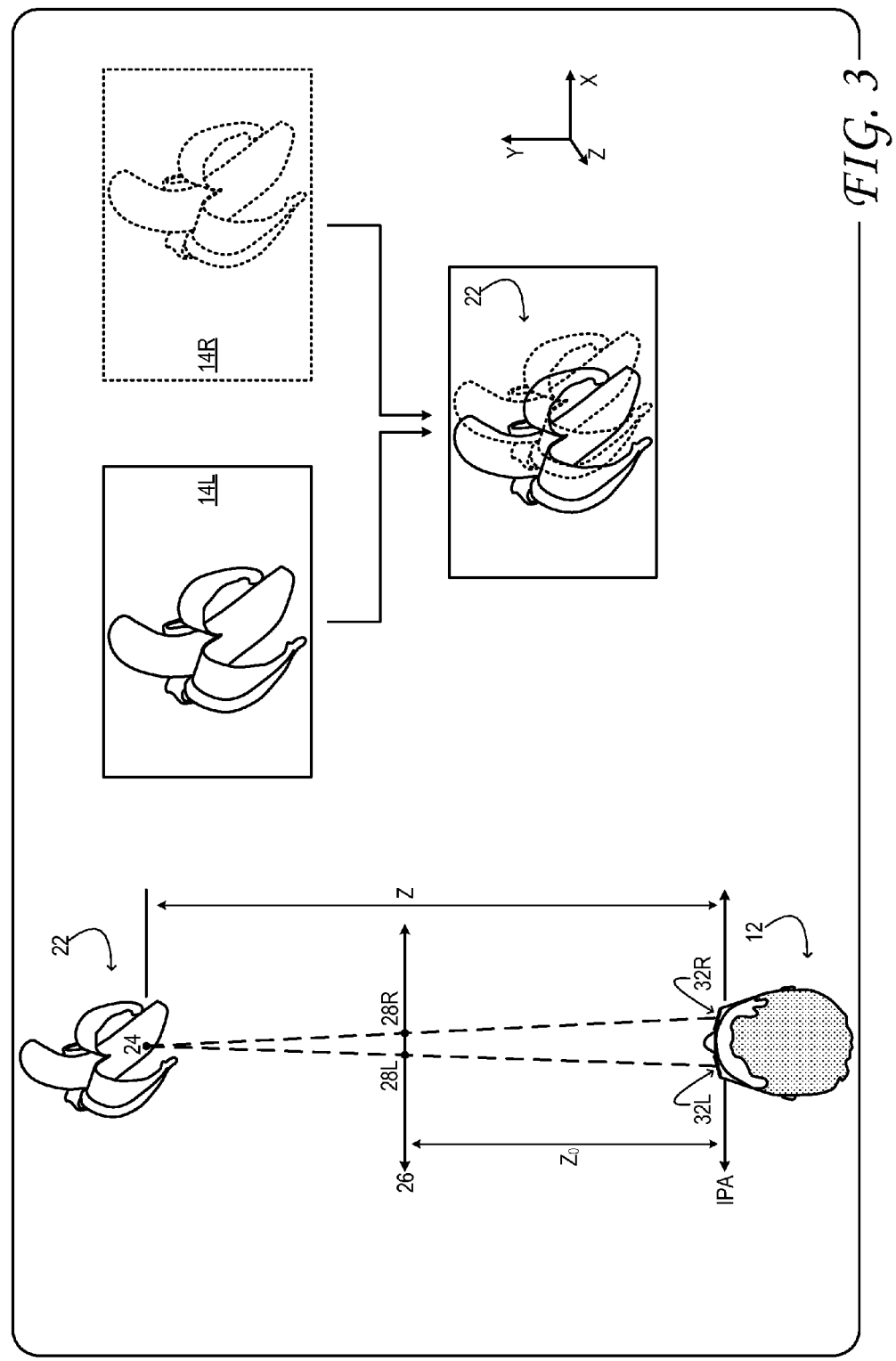
FIG. 3 shows aspects of displaying a 3D virtual image according to an example of the disclosure.

Referring now to FIG. 3, each digitally presented display object 22 is a collection of numerous visible loci 24 rendered in pixels. If the display object is to be presented in 3D, then, for each locus of the object, the display system projects at least two pixels onto display's focal plane 26. For example, a right pixel 28R is projected via right display optic 14R, and a left pixel 28L is projected via left display optic 14L. The horizontal disparity between right and left pixels of the same locus partly determines the apparent depth of that locus—i.e., distance in front of the observer. In some embodiments, such as the field-sequential color display of FIG. 2, each pixel corresponds to a single color. For full color display, six pixels may be used for each locus—a red, green, and blue pixel for each of the two display optics.

Conveniently in AR environments, the position of a virtual display object and every locus thereof may be specified with respect to a global coordinate system, or frame of reference. In this manner, the virtual object may be positioned at a specific location within a real environment, and may keep its position regardless of the orientation of the observer in that environment. Another coordinate system is local to the head-worn display device; this is the coordinate system on which the right and left pixels are projected. Thus, to make a virtual object appear at a desired position and orientation, the global coordinates of every locus of the object are converted into local, device coordinates. This may be done by applying variable translation and rotation operations, which depend on the observer's position and orientation in the environment, and on the tilt and rotation of the observer's head. As the observer is free to move about within the environment and to move his or her head, the appropriate translational and rotational offsets to allow conversion between global and local reference frames may be updated in real time to display a virtual object such that it appears to be in the intended place and have the intended orientation as the observer's perspective changes. To this end, display device 10 of FIG. 1 includes an inertial measurement unit (IMU) 34 configured to quantify a head movement of the observer. Further, display device also may track head motion via other mechanisms, such as one or more image sensors, as explained below.

Figure 4:
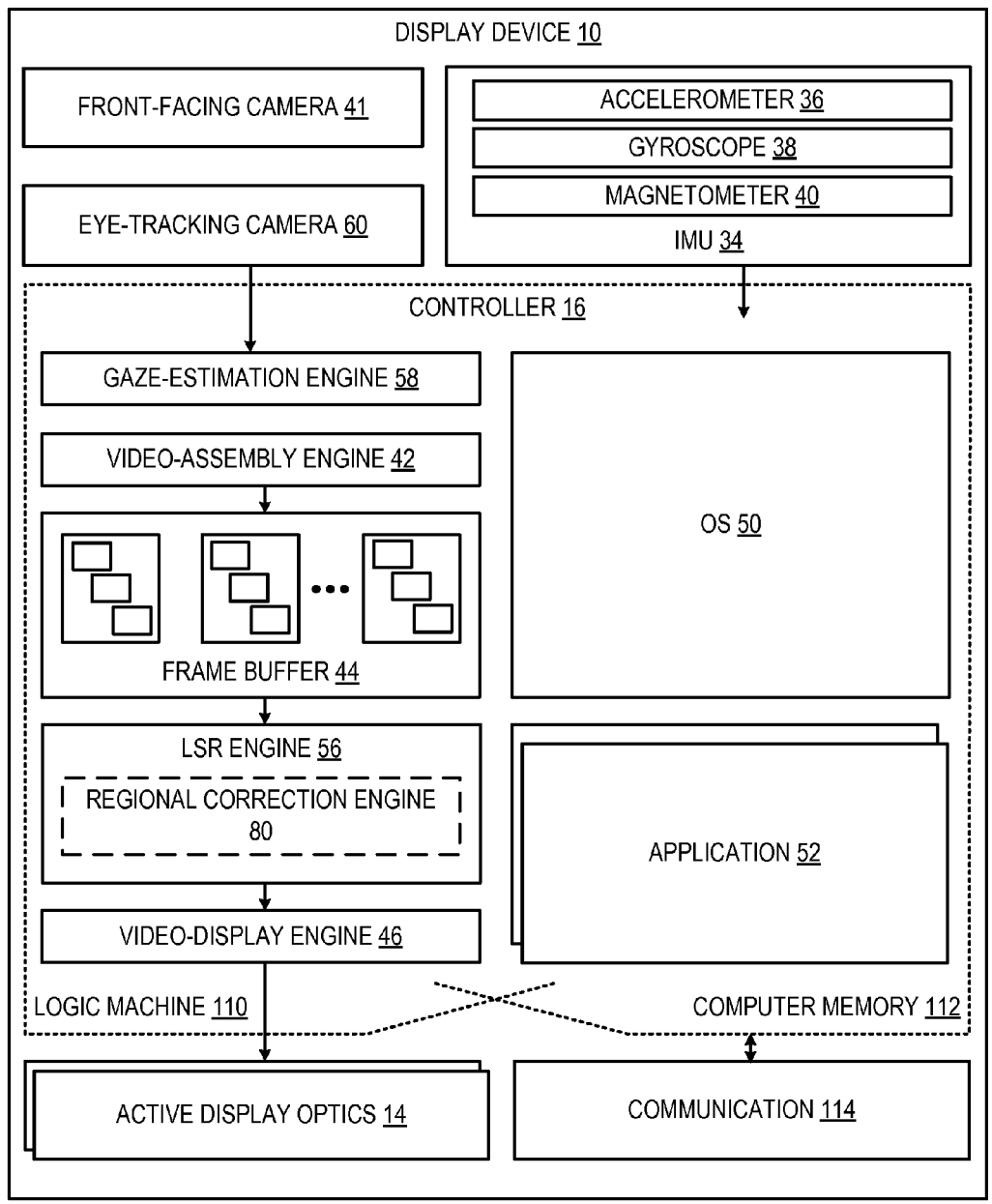
FIG. 4 shows additional aspects of the wearable display device of FIG. 1.

FIG. 4 shows a block diagram illustrating additional aspects of display device 10. As shown in the drawing, IMU 34 includes motion sensing componentry, such as an accelerometer 36, a gyroscope 38, and a magnetometer 40. The accelerometer and gyroscope may furnish inertial data along three orthogonal axes as well as rotational data about the three axes, for a combined six degrees of freedom. Data from the accelerometer and gyroscope may be combined with geomagnetic data from the magnetometer to further define the inertial and rotational data in terms of geographic orientation.

Display device 10 also includes a front-facing camera 41, which may be configured to image a portion of the observer's field of view. In some embodiments, image data from one or more cameras of the wearable display device (e.g., front-facing camera 41 or eye-tracking camera 60) may be used to refine or supplement the positional data from IMU 34, or may be used alone to track motion, by tracking the changes in position of imaged features in the physical environment as the camera moves within the physical environment. In these and other embodiments, positional data may be provided to controller 16 of display device 10.

The display systems disclosed herein are capable of displaying video, including 3D video, as well as static images. The term 'video' as used herein includes video rendered dynamically by a game or other application, pre-rendered video, (e.g. pre-recorded video), and combinations thereof. In the embodiment of FIG. 4, display device 10 includes video-assembly engine 42. The video-assembly engine is configured to assemble a sequence of consecutive frames of video, which are stored in frame buffer 44. In one mode of operation, video-display engine 46 retrieves the video frames in sequence from the frame buffer and drives active display optics 14 according to the image content encoded in the video frames.

Because display device 10 is a field-sequential color display, each frame of video is composed of multiple different color subframes—e.g., red, green, and blue subframes—which are sequenced for display according to a schedule. In some embodiments, a second green subframe is included in the schedule. As noted above, color content from each subframe is presented in rapid succession. Because the various color subframes of a video stream are displayed in sequence and with an associated latency, each subframe corresponds to a unique moment in time, referred to herein as a 'time index.'

Figure 5:
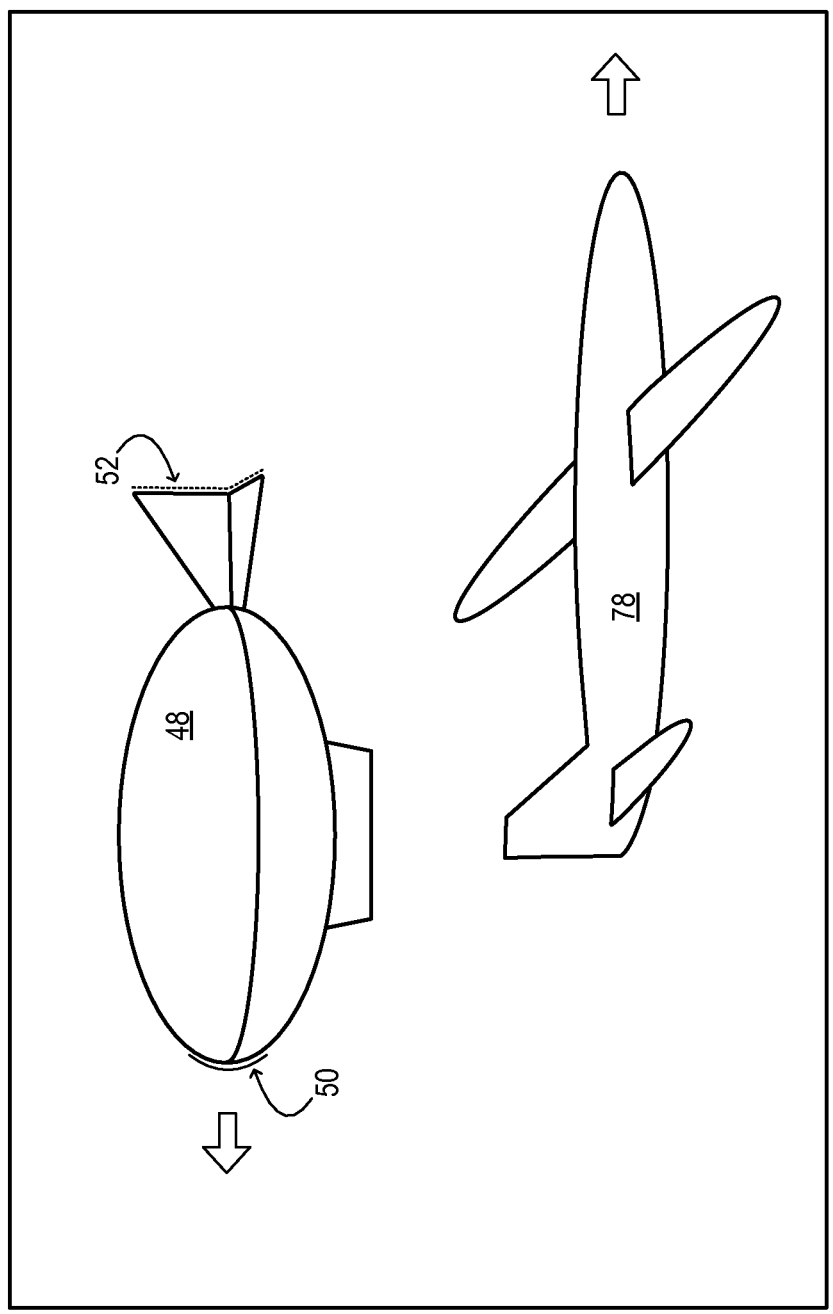
FIG. 5 shows aspects of an example frame of video including two objects moving in different directions.

Due to the fact that each color subframe arrives at a different time index, color fringing can occur when the observer moves his or her head while viewing stationary virtual objects, or while tracking moving virtual objects with his or her eyes. One example of the former case is where the user fixates on the object while shaking their head back and forth. In this condition, the position of the object is computed at the beginning of each frame, and the color subframes are each rendered in the same location on the display. However, due to the head motion, the eyes are scanning over the surface of the display to keep the object fixated. As a result, the color subframes land on different parts of the retina and color fringing occurs. FIG. 5 illustrates the case where color fringing arises due to object motion. The drawing represents video of an object 48 (an image of a blimp) moving to the left. If the color subframes of the video are presented in the sequence {red, green, blue}, then, at any instant in time, as the eye follows motion of the blimp, the sequentially displayed color fields of a single frame of image data, which are displayed at a same location relative to a real-world background, may be projected onto different locations of the user's retina as the user's eye smoothly follows the blimp. In such instances, to the user, the nose of the blimp will appear to have a blue fringe 50, and the tail will appear to have a red fringe 52. This phenomenon is referred to as 'color fringing' or 'color break-up', and the magnitude of the separation depends upon a magnitude of the difference in velocity between the head motion (if any) and object motion.

In the case of head motion while viewing stationary virtual objects, one remedy for color fringing in display device 10 applies late-stage re-projection (LSR) engine 56 to adjust the various color subframes of the video after the video is fully rendered and residing in frame buffer 54. More particularly, the LSR engine transforms each color subframe of each frame by a different transform to account for the motion of the observer's head—applying any suitable homography, for example. The term 'transform' as used herein may include virtually any type of coordinate transform—e.g., a combination of translational, rotational and scaling transforms applied in a predefined sequence. In this remedy, the vector-valued velocity of the observer's head is determined, wherein the head velocity vector may include one or more angular velocity components and/or translational velocity components obtained based on the output of IMU 34, image sensor 41, and/or other motion sensor(s). Once the color subframes are transformed appropriately, video-display engine 46 displays each subframe in succession. This solution removes color fringing in the case where the user is observing a world-locked virtual object while moving his or her head.

However, the above approach does not take into account the observer's natural tendency to move his or her head relative to the global coordinate system and/or eyes relative to the local coordinate system, for example, while visually tracking a moving virtual object. As described above, where the individual color sub-frames of a moving object are each updated based on the latest head position, such eye and/or head motion will cause the object not to be imaged at the same position on the observer's retinae for all color sub-frames, which leads to color fringing.

To address the above problem, this disclosure provides a refined LSR approach that may mitigate the effects of eye or head movement as a user's gaze tracks motion of a displayed object. To this end, LSR engine 56 of FIG. 4 may be configured to compute a vector-valued differential velocity of the moving object relative to a motion of the head of an observer. The differential velocity is computed as the vector sum of the known or discoverable velocity of the moving object and the velocity of display device 10 within the global coordinate system, which captures head movement.

Where the vector-valued velocity of the object is known, such a correction may be performed without any use of eye tracking. Further, in some implementations, an optional gaze-estimation engine 58 may be used to obtain additional information regarding the motion of displayed objects, such as which of multiple displayed objects is being tracked by the observers. Gaze tracking also may be used to recover object motion from video where such motion is not known by the system displaying the video.

Where included, gaze-estimation engine 58 may differ substantially in different embodiments of this disclosure. In some embodiments, the gaze-estimation engine is operatively coupled to an eye-rotation sensor and configured to receive input therefrom. The eye-rotation sensor may be an electrooculographical sensor in some implementations. In the embodiment of FIG. 2, however, the eye-rotation sensor is an eye-imaging subsystem that includes eye-imaging camera 60 and associated componentry. It will be appreciated that these examples of gaze estimation technologies are presented for example, and are not intended to be limiting in any manner. Further, in some implementations, a gaze estimation engine may be omitted, or may be present but not used for color fringing correction, such as in instances where displayed object motion information is provided by a rendering engine.

Referring again to FIG. 2, display device 10 includes an eye-imaging camera 60, an on-axis illumination source 62 and an off-axis illumination source 62'. Each illumination source emits infrared (IR) or near-infrared (NIR) illumination in a suitable wavelength band of the eye-imaging camera. Each illumination source may comprise an IR LED or diode laser, for example. The terms 'on-axis' and 'off-axis' refer to the direction of illumination with respect to the optical axis A of the eye-imaging camera.

Through a suitable objective-lens system, eye-imaging camera 60 detects light over a range of field angles, mapping such angles to corresponding pixels of a rectangular or other pixel array. In one embodiment, the eye-imaging camera may detect the light in a plurality of wavelength channels—e.g., red, green, blue, etc.—associated with a subset of the pixels of the array. Alternatively or additionally, a monochromatic eye-imaging camera may be used, which images one or more of visible, near-infrared (NIR), infrared (IR), and ultraviolet (UV) light in grayscale. Controller 16 may be configured to use the output from the eye-imaging camera to estimate and track the gaze direction V of observer 12, as further described below.

On- and off-axis illumination serve different purposes with respect to gaze estimation. As shown in FIG. 2, off-axis illumination may create a specular glint 64 that reflects from the cornea 66 of the observer's eye. Off-axis illumination may also be used to illuminate the eye for a 'dark pupil' effect, where pupil 68 appears darker than the surrounding iris 70. By contrast, on-axis illumination from an IR or NIR source may be used to create a 'bright pupil' effect, where the pupil appears brighter than the surrounding iris. More specifically, IR or NIR illumination from on-axis illumination source 62 illuminates the retroreflective tissue of the retina 72 of the eye, which reflects the light back through the pupil, forming a bright image 74 of the pupil. Beam-turning optics 76 of active display optic 14 enable the eye-imaging camera and the on-axis illumination source to share a common optical axis A, despite their arrangement on the periphery of the active display optic. In some embodiments, the eye-imaging camera may include a wavelength filter blocking transmission outside of the emission band of the illumination sources, to enhance bright-pupil contrast in the presence of strong ambient light.

Digital image data from eye-imaging camera 60 may be conveyed to associated logic in controller 16 and/or in a remote computer system accessible to the controller via a network. There, the image data may be processed to resolve such features as the pupil center, pupil outline, and/or one or more specular glints 64 from the cornea. The locations of such features in the image data may be used as input parameters in a model—e.g., a polynomial model—that relates feature position to the gaze vector V. In embodiments where a gaze vector is determined for the right and left eyes, the controller may also be configured to compute the observer's focal point as the intersection of the right and left gaze vectors.

As mentioned above, in some implementations, the retina positions are not tracked via a gaze-estimation engine, but rather are predicted based on the assumption that the observer's gaze will pursue the most prominent moving object. In embodiments in which the observer's gaze is assumed to pursue a moving object, eye-tracking camera 60 and associated componentry may be omitted, or otherwise not utilized for color fringing mitigation.

Figure 6:
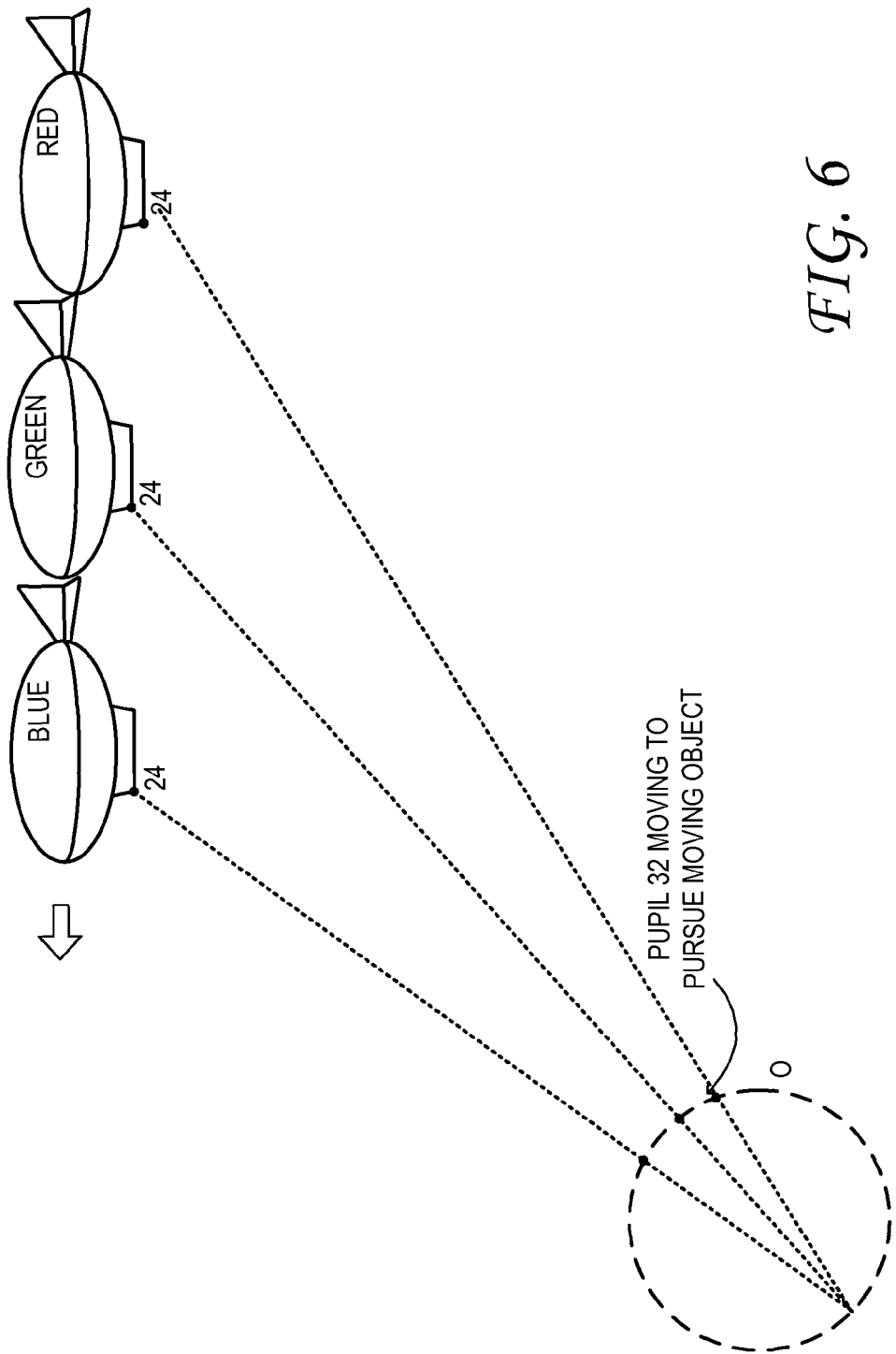
FIG. 6 shows aspects of displaying a 3D image of a moving object according to an example of the disclosure.

Whether by known object velocity and/or gaze tracking, late-stage re-projection engine 56 computes a vector-valued differential velocity of the moving object relative to the moving head of the observer—viz., the velocity of display device 10 in the global coordinate system. Then, at a time scheduled for display of a first color subframe of a given frame video-display engine 46 displays first-color image content transformed by a first transform, and, at a time scheduled for display of a second color subframe of the given frame, displays second-color image content transformed by a second transform, the first and second transforms accounting for the vector-valued differential velocity. Aspects of this solution are shown in FIG. 6, where the various transforms are computed so that light is imaged at substantially the same location on the observer's retina. As used here, the term "substantially the same location" and the like refer to a sufficient similarity as to mitigate color fringing artifacts.

The solutions above may reduce or prevent color fringing on a virtual object tracked by an observer's gaze by applying a global correction. A global correction may be based on relative motion of a single, tracked object, and applied in every region of the corrected video frames. As such, the solutions above, while reducing color fringing of the tracked object, may increase color fringing in other moving objects, particularly those moving in a direction opposite that of the tracked object. In other words, in the scenario of FIG. 5, the global correction may cause the nose of the airplane, object 78, to appear red, and the tail of the airplane to appear blue.

To address the above issue, LSR engine 56 of FIG. 4 may include an optional regional correction engine 80. The regional correction engine is configured to transform a region of a given color subframe localized on the moving object targeted by the observer. In this manner, a correction may be applied specifically in the vicinity of the object pursued by the observer's gaze, while other virtual imagery escapes undue correction. As in the above-described implementations, the different transforms are chosen based on the vector-valued differential velocity of the targeted, moving object relative to the observer's head. After applying the transform to any regions of the color subframe, the regional correction engine 80 combines the different regions of the image, and then submits the combined subframe to video-display engine 46.

Figure 7:
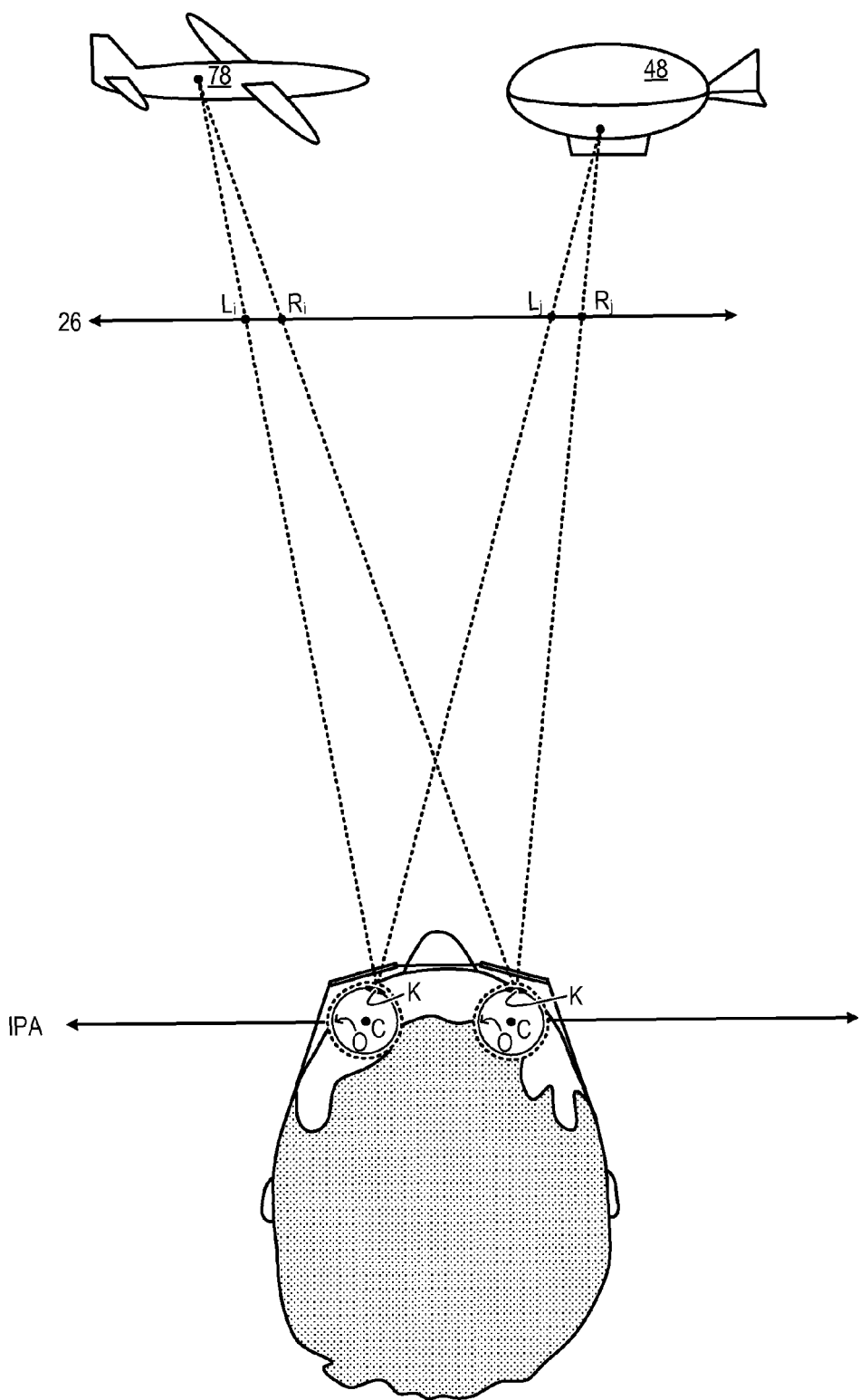
FIG. 7 shows aspects of displaying a 3D image including two objects moving in different directions according to an example of the disclosure.

The regional correction approach may be applied to correct color fringing on two or more moving objects in the video—e.g., objects moving in different directions, as shown in FIG. 5. Here, regional correction engine 80 may be configured to determine different transforms for a plurality of different localized portions, illustrated as a portion surrounding object 48 and a different portion surrounding object 78. The transforms to be performed may be determined by using gaze tracking to determine which object is being tracked, or by predicting which object the observer's gaze will likely follow (e.g. based upon context, object size, object location, etc.). As shown in FIG. 7, where the pupils K are directed toward and following the tracked object 48, the relative motion of object 48 relative to the other displayed objects (e.g. object 78) may be used, in combination with any head motion, to determine appropriate regional transforms to apply to the color fields of the image region of each color field image containing object 78.

Figure 8:
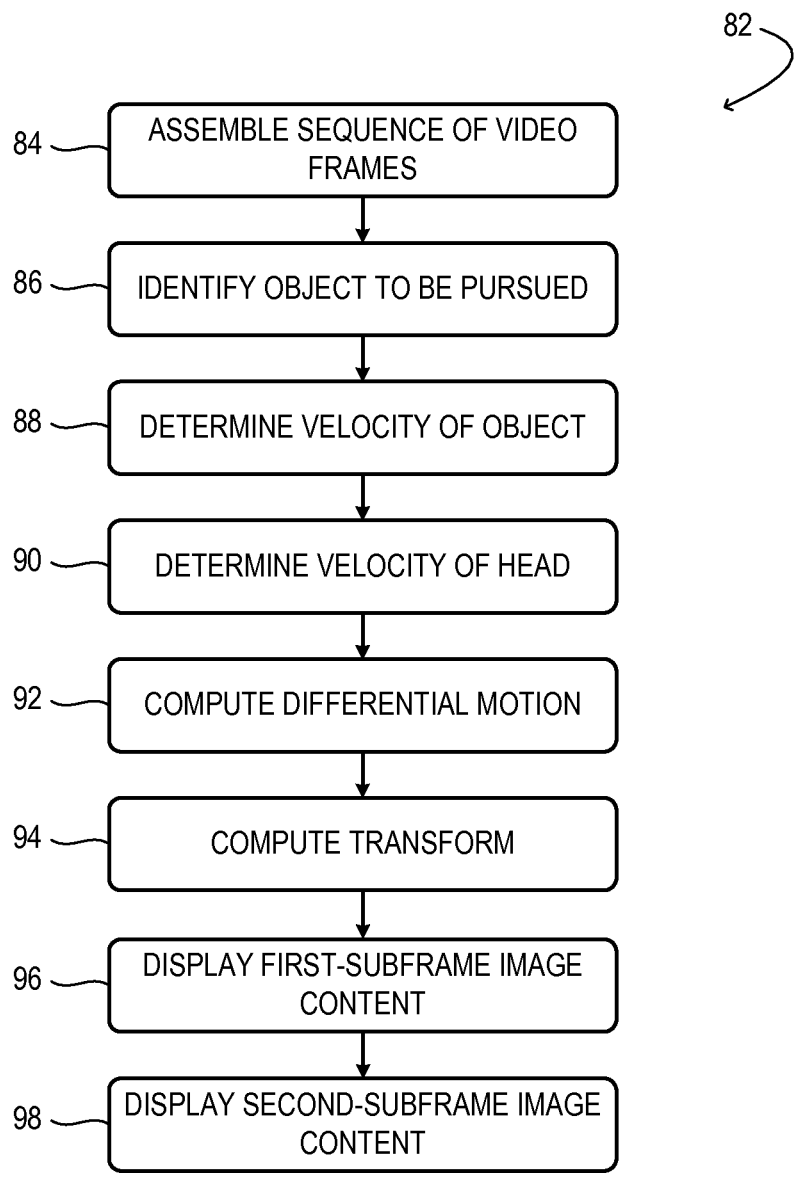
FIG. 8 illustrates an example method to display video in a field-sequential color mode.

FIG. 8 illustrates an example method 82 to display video on a display device in field-sequential color mode. At 84 is assembled a sequence of consecutive frames of video. The video may feature a moving object, or a plurality of moving objects. In some embodiments, the video may be assembled based on data received from an external device over a network. In other embodiments, the video may be rendered in the display device itself—in a video-assembly engine of the display device. In method 82, each video frame includes a plurality of color subframes sequenced for display according to a schedule. Accordingly, a different time index may be associated with each subframe.

At 86, a moving object is selected from the video. The selected moving object is the object that the user's gaze is assumed or determined to pursue. In some embodiments, the object to be selected is identified by application-level code executing on the display device, which also controls the rendering of the object. In other embodiments, a heuristic or other rule may be used to determine which object is selected. The selected object may be the biggest, brightest, closest, or fastest-moving object, for example. In some embodiments, a late-stage re-projection engine of the display device may be configured to automatically select the moving object from among a plurality of objects in the video. In yet other examples, the object may be determined from gaze tracking, for example, as a displayed object that is intersected by a user gaze direction.

At 88 the vector-valued velocity of the moving object is determined in the local coordinate system. The vector-valued velocity may be determined by analysis of the video, for example, or it may be revealed by application-level code. In instances where the video content is rendered within the wearable display device, direct knowledge of the velocity of the object. Gaze tracking may be used when the observer is viewing pre-rendered video to determine the velocity of a tracked object within that video. At 90 the vector-valued velocity of a head of the observer is determined. In general, determining the vector-valued velocity of the head includes quantifying a head movement of the observer—e.g., a translation, a rotation, or any combination thereof. Such motion may be quantified via inertial motion sensors, image data, and/or in any other suitable manner.

At 92 is computed the vector-valued differential velocity of the selected, moving object relative to the head of the observer of the video. The differential velocity may be obtained as the difference of the vector-valued velocities computed at 88 and 90, above. In some embodiments, the vector-valued differential velocity may include an angular velocity.

At 94 a transform is computed for each of the color subframes—e.g., a red, green, and blue subframe—of each frame of the video. The transform is computed based on the vector-valued differential velocity computed at 92. In particular, the transform may be computed so that, for each locus of a moving object in the video, light from the red, green, and blue pixels corresponding to that locus all are imaged at substantially the same location on the observer's retina. In some implementations, different regional transforms may be performed for different displayed objects having different relative motion to one another.

At 96, at a time scheduled for display of a first subframe, first-subframe image content transformed by a first transform is displayed. At 98, at a time scheduled for display of a second subframe, second-subframe image content transformed by a second transform is displayed. The acts of displaying the first- and second-subframe image content may include illuminating the first and second pixels referred to above.

As mentioned above, in some examples, where the moving object is one of a plurality of moving objects featured in the video, the LSR engine of the display device may be configured to compute vector-valued differential velocities for each of the moving objects relative the movable retina. Here, the regional correction engine 80 may be configured to apply different transforms to different regions of each video subframe—e.g., regions localized on different moving objects, again based on the vector-valued differential velocities. In such examples, the individually transformed regions of each subframe may be combined before display of the subframes.

The description above should not be construed as limiting in any way, because numerous alternative implementations are also envisaged. For instance, although head mounted wearable display device 10 is described as a see-through device for AR applications, fully immersive display devices for virtual-reality (VR) applications are equally applicable to the methods here disclosed. This disclosure also encompasses non-wearable display systems—stationary or hand-held display screens that display only 2D video, or 3D video viewable through passive eyewear. Indeed, this disclosure is applicable to any method of video display in which each video frame is divided into subframes scheduled for presentation at a different time. While the subframe content in the foregoing description is color subframe content, even this aspect is not strictly necessary, because a subframe can also be a geometric portion of a video frame, such as a column or row portion. This idea is illustrated in the following example.

In a 'rolling-shutter' display system, a video frame does not update all at once, but instead updates row-by-row, the updated content rolling down from the one side of the video frame (e.g., top or left) to an opposite side (e.g., bottom or right). Accordingly, if the content is updated in a rolling top-to-bottom fashion, the lower portion of a displayed object receives its update after the upper portion. If the object is moving downward relative to the observer, then the object may appear vertically compressed. If the object is moving upward, it may appear vertically elongated, like object 100 of FIG. 9 in the left-hand frame. A form of LSR may be used to correct these skewing effects, preserving the object's proportions when in motion. In order for the method to provide the appropriate level of compensation when the observer's gaze is tracking the object, the observer's retina motion may be estimated or tracked, rather than assumed to occupy invariant positions in the local coordinate system. The overall correction may be based on object motion, head motion, and scan-line position, for example. When this correction is applied, the object will appear to the observer to have correct proportions, as shown in the right frame of FIG. 9.

Figure 10:
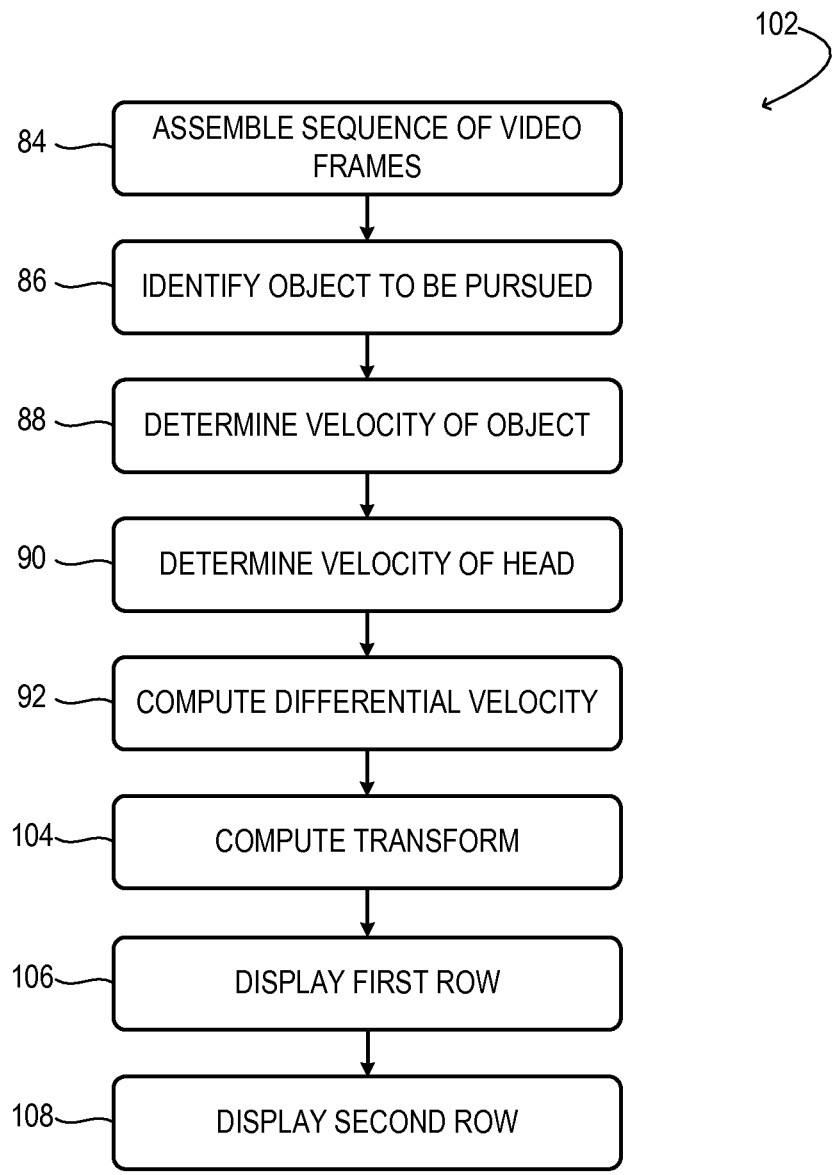
FIG. 10 illustrates an example method to display video in a rolling-shutter mode.

FIG. 10 illustrates an example method 102 to display video in a rolling-shutter mode. At 84 is assembled a sequence of consecutive video frames featuring a moving object. Each video frame includes a plurality of row subframes sequenced for display according to a schedule. At 86, a moving object is selected from the video as the object as tracked by the observer, whether by assumption or detection. At 88 the vector-valued velocity of the moving object is determined. At 90 the vector-valued velocity of a head of the observer is determined. At 92 is computed the vector-valued differential velocity of the moving object relative to the head of an observer of the video.

At 104 a transform is computed for each of the row subframes—e.g., top row, second row, bottom row. The first subframe provides image content for a first (e.g. higher) row of pixels, and the second subframe provides image content for a second (e.g. lower) row of pixels. The transforms are computed based on the vector-valued differential velocity computed at 92. The transforms may be applied globally to the corresponding rows, or may be applied locally to regions containing an object that moves between image frames.

At 106, at a time scheduled for display of a first row subframe, first-subframe image content transformed by a first transform is displayed. At 108, at a time scheduled for display of a second row subframe, second-subframe image content transformed by a second transform is displayed.

As evident from the foregoing description, the methods and processes described herein may be tied to a computer system of one or more determining machines. Such methods and processes may be implemented as a computer-application program or service, an application-programming interface (API), a library, and/or other computer-program product. The reader is again referred to FIG. 4, which shows in simplified form a non-limiting example of display-device controller 16—a computer system configured to enact the methods and processes described herein. The computer system includes a logic machine 110 and a data-storage, or computer-memory machine 112. The computer system also includes active display optics 14, a communication machine 114, and various components not shown the drawing.

Logic machine 110 includes one or more physical logic devices configured to execute instructions. A logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 110 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked devices configured in a cloud-determining configuration.

Computer-memory machine 112 includes one or more physical, computer-memory devices configured to hold instructions executable by an associated logic machine 110 to implement the methods and processes described herein. When such methods and processes are implemented, the state of the computer-memory machine may be transformed—e.g., to hold different data. A computer-memory machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A computer-memory machine may include volatile, nonvolatile, dynamic, static, read/write, read-only, random-access, sequential-access, location-addressable, file-addressable, and/or content-addressable devices.

It will be appreciated that computer-memory machine 112 includes one or more physical devices. However, aspects of the instructions described herein alternatively may be propagated by a communication medium (e.g., an electromagnetic signal, an optical signal, etc.), as opposed to being stored via a storage medium.

Aspects of logic machine 110 and computer-memory machine 112 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'program' and 'engine' may be used to describe an aspect of a computer system implemented to perform a particular function. In some cases, a program or engine may be instantiated via a logic machine executing instructions held by a computer-memory machine. It will be understood that different programs and engines may be instantiated from the same application, service, code block, object, library, routine, API, function, etc. Likewise, the same program or engine may be instantiated by different applications, services, code blocks, objects, routines, APIs, functions, etc. A program or engine may encompass individual or groups of executable files, data files, libraries, drivers, scripts, database records, etc.

Display 14 may be used to present a visual representation of data held by computer-memory machine 112. This visual representation may take the form of a graphical user interface (GUI). As the herein described methods and processes change the data held by the computer-memory machine, and thus transform the state of the computer-memory machine, the state of display 14 may likewise be transformed to visually represent changes in the underlying data. Display 14 may include one or more display devices utilizing virtually any type of technology. Such display devices may be combined with logic machine 110 and/or computer-memory machine 112 in a shared enclosure, or such display devices may be peripheral display devices.

Communication machine 114 may be configured to communicatively couple the computer system to one or more other machines, including server computer systems. The communication machine may include wired and/or wireless communication devices compatible with one or more different communication protocols. As non-limiting examples, a communication machine may be configured for communication via a wireless telephone network, or a wired or wireless local- or wide-area network. In some examples, a communication machine may allow a determining machine to send and/or receive messages to and/or from other devices via a network such as the Internet.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example is directed to a method to display video enacted on a display device. The method comprises: assembling a sequence of consecutive video frames featuring a moving object, each video frame including a plurality of subframes sequenced for display according to a schedule; determining a vector-valued differential velocity of the moving object relative to a head of an observer of the video; at a time scheduled for display of a first subframe of a given frame, displaying first-subframe image content transformed by a first transform; and at a time scheduled for display of a second subframe of the given frame, displaying second-subframe image content transformed by a second transform, the first and second transforms computed based on the vector-valued differential velocity.

In some implementations, displaying the first- and second-subframe image content includes illuminating first and second pixels, respectively of the first- and second-subframe image content, each corresponding to a given locus of the object, wherein the first and second transforms are computed so that light from the first and second pixels is imaged at substantially the same location on a retina of the observer. In some implementations, the video may be displayed in a field-sequential color mode, wherein the first subframe provides image content of a first color component and the second subframe provides image content of a second color component. In some implementations, the video may be displayed in a rolling-shutter mode, wherein the first subframe provides image content limited to a first row of pixels and the second subframe provides image content limited to a second row of pixels. In these and other implementations, determining the vector-valued differential velocity may include quantifying a head movement of the observer via motion sensor data. In these and other implementations, determining the vector-valued differential velocity may further comprise tracking a gaze of the observer to determine that the gaze of the observer is following the moving object. In these and other implementations, determining the vector-valued differential velocity may further comprise determining a vector-valued velocity of the moving object via an application displaying the moving object, and determining the vector-valued differential velocity based upon the vector-valued velocity of the moving object.

Another example is directed to a field-sequential color display system comprising: a video-assembly engine configured to assemble a sequence of consecutive video frames featuring a moving object, each video frame including a plurality of color subframes sequenced for display according to a schedule; a late-stage re-projection engine configured to compute a vector-valued differential velocity of the moving object relative to a movable head of an observer; and a video-display engine configured to, at a time scheduled for display of a first color subframe of a given frame, display first-color image content transformed by a first transform, and, at a time scheduled for display of a second color subframe of the given frame, displaying second-color image content transformed by a second transform, the first and second transforms computed based on the vector-valued differential velocity.

In some implementations, the video-display engine includes right and left display optics arranged for stereoscopic video display. In these and other implementations, the video-display engine may be configured to, in displaying the first- and second-subframe image content, illuminate first and second pixels, respectively of the first- and second-subframe image content, each corresponding to a given locus of the object, wherein the first and second transforms are computed so that light from the first and second pixels is imaged at substantially a same location on a retina of the observer. In some implementations, the video-assembly engine, the late-stage re-projection engine, and the video-display engine may be components of a wearable display device configured to be worn on the head. Some implementations may further comprise a motion sensor configured to quantify a head movement of the observer. In some implementations, the wearable display device includes a see-through optic configured to transmit real, external imagery which is presented to the observer in combination with the video. In some implementations, the system may further comprise a gaze-estimation engine configured to track a gaze of the observer to determine that the gaze of the observer is following the moving object. In these and other implementations, the gaze-estimation engine may be configured to determine a vector-valued velocity of the moving object via gaze tracking. In some implementations, determining the vector-valued differential velocity may comprise determining a vector-valued velocity of the moving object from an application displaying the object.

Another example provides a field-sequential color display system comprising: a video-assembly engine configured to assemble a sequence of consecutive predetermined or computer rendered video frames featuring a moving object, each video frame including a plurality of color subframes sequenced for display according to a schedule; a late-stage re-projection engine configured to compute a vector-valued differential velocity of the moving object relative to a movable head of an observer; a regional correction engine configured to transform different regions of a given color subframe by different transforms, the different regions including a region localized on the moving object, and the different transforms computed based on the vector-valued differential velocity; and a video-display engine configured to display the first color subframe.

In some implementations, the moving object is selected from a plurality of moving objects in the video, and the late-stage re-projection engine is configured to receive input identifying the moving object selected. In some implementations, the late-stage re-projection engine is configured to automatically select the moving object from among a plurality of moving objects in the video. In some implementations, the moving object is one of a plurality of moving objects featured in the video, the late-stage re-projection engine is configured to compute vector-valued differential velocities for each of the moving objects relative the movable head, and the different transforms are computed so as to reduce color fringing in each of the different regions.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a display device, a method to display video, comprising:
    assembling a sequence of consecutive video frames featuring a moving object, each video frame including a plurality of subframes sequenced for display according to a schedule;
    determining a vector-valued differential velocity of the moving object relative to a head of an observer of the video;
    at a time scheduled for display of a first subframe of a given frame, displaying first-subframe image content transformed by a first transform within a first region of the first subframe and by a second transform within a second region of the first subframe, the first region being a region localized on the moving object, wherein the first transform is computed based on the vector-valued differential velocity; and
    at a time scheduled for display of a second subframe of the given frame, displaying second-subframe image content transformed by a third transform within the first region of the second subframe and by a fourth transform within the second region of the second subframe, wherein the third transform is computed based on the vector-valued differential velocity, and
    wherein displaying the first- and second-subframe image content includes illuminating first and second pixels, respectively of the first- and second-subframe image content, each corresponding to a given locus of the object within the first region, and wherein the first and third transforms are computed so that light from the first and second pixels is imaged at substantially a same location on a retina of the observer.

2. The method of claim 1, wherein the video is displayed in a field-sequential color mode, and wherein the first subframe provides image content of a first color component and the second subframe provides image content of a second color component.

3. The method of claim 1, wherein the video is displayed in a rolling-shutter mode, and wherein the first subframe provides image content limited to a first row of pixels and the second subframe provides image content limited to a second row of pixels.

4. The method of claim 1, wherein determining the vector-valued differential velocity includes quantifying a head movement of the observer via motion sensor data.

5. The method of claim 1, wherein determining the vector-valued differential velocity further comprises tracking a gaze of the observer to determine that the gaze of the observer is following the moving object.

6. The method of claim 1, wherein determining the vector-valued differential velocity further comprises determining a vector-valued velocity of the moving object via an application displaying the moving object, and determining the vector-valued differential velocity based upon the vector-valued velocity of the moving object.

7. The method of claim 1 wherein displaying the first- and second-subframe image content further includes illuminating third and fourth pixels, respectively of the first- and second-subframe image content, each corresponding to a given locus of the object within the second region, and wherein the second and fourth transforms are computed so that light from the third and fourth pixels is imaged at substantially a same location on the retina of the observer.

8. A field-sequential color display system comprising:
    a video-assembly engine configured to assemble a sequence of consecutive video frames featuring a moving object, each video frame including a plurality of color subframes sequenced for display according to a schedule;
    a gaze-estimation engine configured to track a gaze of the observer to determine that the gaze of the observer is following the moving object;
    a late-stage re-projection engine configured to compute a vector-valued differential velocity of the moving object relative to a movable head of an observer;
    a regional correction engine configured to transform different regions of a given color subframe by different transforms, the different regions including a region localized on the moving object; and
    a video-display engine configured to, at a time scheduled for display of a first color subframe of a given frame, display first-color image content transformed by a first transform in a region of the moving object, and, at a time scheduled for display of a second color subframe of the given frame, displaying second-color image content transformed by a second transform in the region of the moving object, the first and second transforms being computed based on the vector-valued differential velocity.

9. The system of claim 8, wherein the video-display engine includes right and left display optics arranged for stereoscopic video display.

10. The system of claim 8, wherein the video-display engine is configured to, in displaying the first- and second-subframe image content, illuminate first and second pixels, respectively of the first- and second-subframe image content, each corresponding to a given locus of the object, and wherein the first and second transforms are computed so that light from the first and second pixels is imaged at substantially a same location on a retina of the observer.

11. The system of claim 8, wherein the video-assembly engine, the late-stage re-projection engine, and the video-display engine are components of a wearable display device configured to be worn on the head.

12. The system of claim 11, further comprising a motion sensor configured to quantify a head movement of the observer.

13. The system of claim 11, wherein the wearable display device includes a see-through optic configured to transmit real, external imagery which is presented to the observer in combination with the video.

14. The system of claim 8, further comprising a gaze-estimation engine configured to track a gaze of the observer to determine that the gaze of the observer is following the moving object.

15. The system of claim 14, wherein the gaze-estimation engine is configured to determine a vector-valued velocity of the moving object via gaze tracking.

16. The system of claim 8, wherein determining the vector-valued differential velocity comprises determining a vector-valued velocity of the moving object from an application displaying the object.

17. A field-sequential color display system comprising:
a video-assembly engine configured to assemble a sequence of consecutive predetermined or computer rendered video frames featuring a moving object, each video frame including a plurality of color subframes sequenced for display according to a schedule;
a late-stage re-projection engine configured to compute a vector-valued differential velocity of the moving object relative to a movable head of an observer;
a regional correction engine configured to transform different regions of a given color subframe by different transforms, the different regions including a region localized on the moving object; and
a video-display engine configured to, at a time scheduled for display of a first color subframe of a given frame, display first-color image content transformed by a first transform in a region of the moving object, and, at a time scheduled for display of a second color subframe of the given frame, displaying second-color image content transformed by a second transform in the region of the moving object, the first and second transforms being computed based on the vector-valued differential velocity.

18. The system of claim 17, wherein the moving object is selected from a plurality of moving objects in the video, and wherein the late-stage re-projection engine is configured to receive input identifying the moving object selected.

19. The system of claim 17, wherein the late-stage re-projection engine is configured to automatically select the moving object from among a plurality of moving objects in the video.

20. The system of claim 17, wherein the moving object is one of a plurality of moving objects featured in the video, wherein the late-stage re-projection engine is configured to compute vector-valued differential velocities for each of the moving objects relative the movable head, and wherein the different transforms are computed so as to reduce color fringing in each of the different regions.

* * * * *